US007194481B1

(12) United States Patent
Van Roon

(10) Patent No.: US 7,194,481 B1
(45) Date of Patent: Mar. 20, 2007

(54) COMPUTER BASED MATCHING SYSTEM FOR PARTY AND COUNTERPARTY EXCHANGES

(75) Inventor: Mark Van Roon, Guelph (CA)

(73) Assignee: BuyFX.com Limited, Hamilton (BM)

( * ) Notice: Subject to any disclaimer, the term of this patent is extended or adjusted under 35 U.S.C. 154(b) by 0 days.

(21) Appl. No.: 09/936,366

(22) PCT Filed: Mar. 13, 2000

(86) PCT No.: PCT/GB00/00909

§ 371 (c)(1),
(2), (4) Date: Dec. 3, 2001

(87) PCT Pub. No.: WO00/55775

PCT Pub. Date: Sep. 21, 2000

(30) Foreign Application Priority Data

Mar. 12, 1999 (CA) .................................... 2264351

(51) Int. Cl.
*G06F 7/00* (2006.01)
*G06F 17/00* (2006.01)

(52) U.S. Cl. .................................... 707/104.1; 707/101

(58) Field of Classification Search ............. 707/104.1; 705/26–27, 34, 39, 41
See application file for complete search history.

(56) References Cited

U.S. PATENT DOCUMENTS

| | | | | |
|---|---|---|---|---|
| 5,852,812 | A * | 12/1998 | Reeder | 705/39 |
| 5,920,847 | A * | 7/1999 | Kolling et al. | 705/40 |
| 6,282,522 | B1 * | 8/2001 | Davis et al. | 705/41 |
| 6,721,715 | B2 * | 4/2004 | Nemzow | 705/26 |

* cited by examiner

*Primary Examiner*—Jeffrey A Gaffin
*Assistant Examiner*—Te Yu Chen
(74) *Attorney, Agent, or Firm*—Synnestvedt Lechner & Woodbridge LLP

(57) ABSTRACT

A computer based system is disclosed which enables a buyer and a seller to be efficiently matched. The system can comprise a web based foreign exchange platform in which parties and counterparties post their requirements. A computer identifies and matches reciprocal, offsetting positions and effects a trade at a price which is the mid-point of the Interbank bid/offer spread. The system is fast, efficient and fair, as well as being significantly cheaper than conventional foreign exchange systems.

12 Claims, 7 Drawing Sheets

FIGURE 2A: PRE-MATCH

| | | | | | | |
|---|---|---|---|---|---|---|
| | | | | | | |
| Available | 10 | CAD | | | | |
| Desired | 577.6834 | JPY | | | | |
| Available | | | 4438.77 | JPY | | |
| Desired | | | 50 | USD | | |
| Available | | | | | 25 | USD |
| Desired | | | | | 38.4187 | CAD |
| | | | | | | |

FIGURE 2B: POST MATCH

| | A | | B | | C | |
|---|---|---|---|---|---|---|
| | | | | | | |
| Available | 0 | CAD | | | | |
| Desired | 0 | JPY | | | | |
| Matched | 577.6834 | JPY | | | | |
| Available | | | 3861.09 | JPY | | |
| Desired | | | 43.4927 | USD | | |
| Matched | | | 6.5073 | USD | | |
| Available | | | | | 18.4927 | USD |
| Desired | | | | | 28.4187 | CAD |
| Matched | | | | | 10 | CAD |

Figure 2C

| Party/Counterparty | Source Currency | Beneficiary Currency |
|---|---|---|
| | | |
| A | AAA | BBB |
| B | BBB | CCC |
| C | CCC | AAA |

Figure 5 The Mechanics of Netting
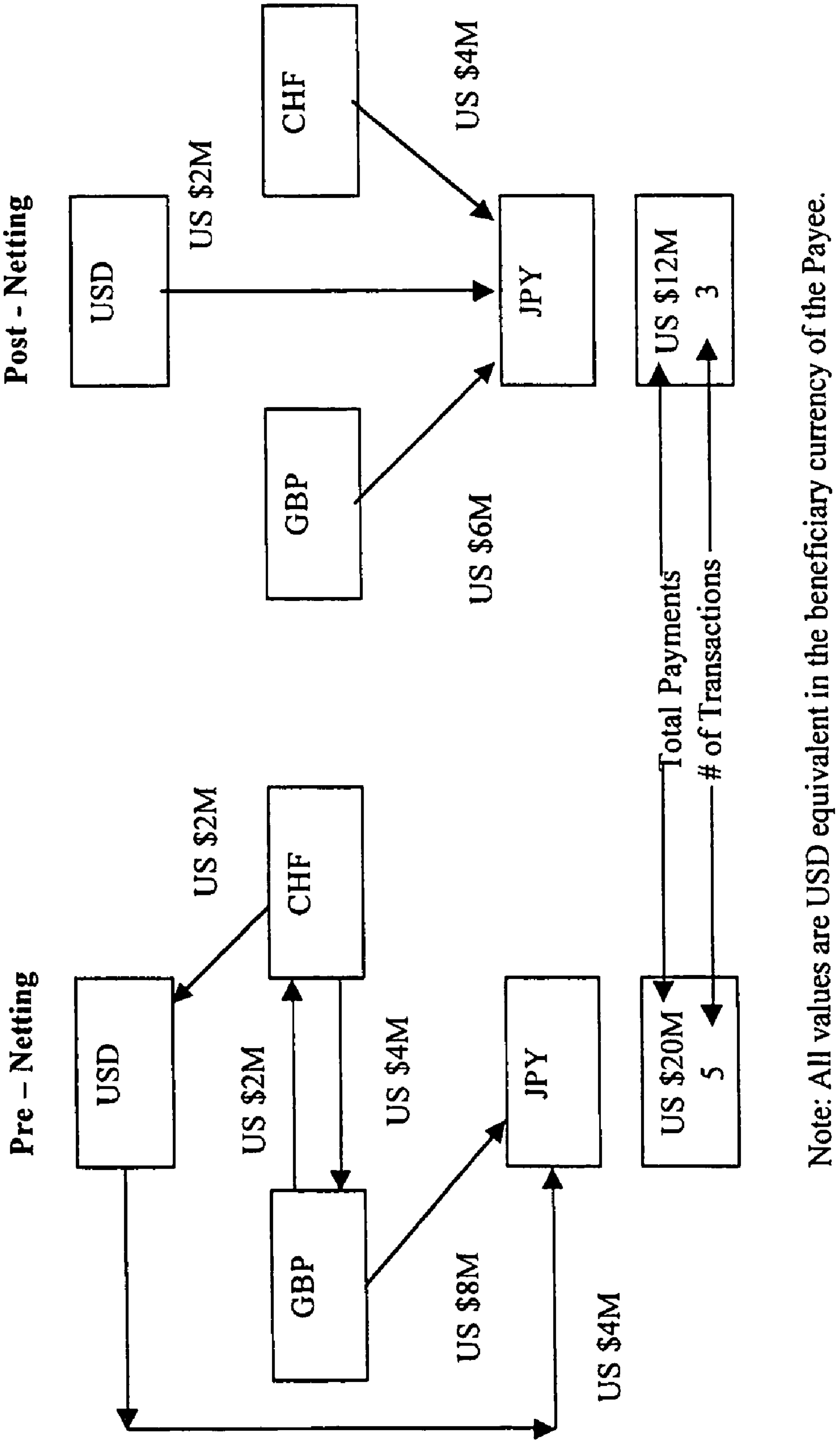

COMPUTER BASED MATCHING SYSTEM FOR PARTY AND COUNTERPARTY EXCHANGES

CROSS REFERENCE TO RELATED APPLICATIONS

This application claims the priority of Canadian application 2,264,351 filed Mar. 12, 1999 and PCT Application No. PCT/GB00/00909 filed Mar. 13, 2000.

BACKGROUND OF THE INVENTION

1. Field of the Invention

This invention relates to a computer-based system, which enables parties and counterparties to be efficiently matched and which uses a netting methodology. The invention is exemplified by a new business model and system for foreign exchange transactions.

2. Description of the Prior Art

The Internet offers the promise of allowing buyers and sellers of goods and services to communicate directly with one another, eliminating the need for some of the intermediaries and the associated economic inefficiencies present in conventional selling. Hence, for example, it is in 1998 possible to transact many kinds of business using the Internet, which formerly would have required a broker or agent. Examples include the purchase of insurance, airline tickets, books and holidays.

The Internet also enables new models of buying and selling as well: for example, there are now many Internet auction sites, on which a wide range of goods and services are auctioned to the highest bidder, with the seller merely setting a reserve price or a bid start price. The terms to 'buy' and 'sell' and related expressions should be broadly construed to include any kind of transfer of rights or interests; 'buyers' and 'sellers' should be also broadly construed to include any transferee and transferor of any kind of right or interest. The terms 'party' and 'counterparty' are commonly used to describe a situation in which a given party is both a buyer and simultaneously a seller. This can arise, for example, where a party wishes to exchange U.S.$100 for the equivalent in Sterling. That party is simultaneously a seller of U.S.$ and a buyer of Sterling.

Computer systems linking many potential buyers and sellers of goods and services over an extensive computer network also existed prior to the widespread adoption of the Internet, particularly in the financial services sector. One example is the foreign exchange dealing systems developed and run by organisations such as Reuters plc and the EBS Partnership. In these systems, banks post the prices at which they are willing to buy or sell defined quantities of currencies. The systems may automatically spot matches—i.e. where a buyer is willing to buy at a price at which a seller is willing to sell—and complete the trade. If a potential buyer of currency can find no one willing to sell at a price it considers low enough, then typically, that potential buyer will simply have to either wait for the pricing in the market to become more favourable, or else be prepared to pay more. Such systems may be used for currency speculation, namely taking a trading position with respect to one or more given currencies to exploit favourable pricing movements.

Where a buyer and seller regularly trade with one another, it is normal to aggregate all transactions over a defined period of time and for just a single net payment to be made. Hence, for example, if party A buys 50 units at $1 from party B over a day, and counterparty B buys 20 units at $1 from party A over that same day, then the respective payment obligations can be netted off so that A pays $30 to B at the end of the day. This same principle applies to the more sophisticated environment of trading foreign exchange and other financial property. Where more than a single party and counter-party pair are involved, for example, a 3 way group or even higher orders, multilateral netting can be applied.

Netting systems should minimize the number of intra and inter company receipts and payments, which incur float costs in the banking system. Netting reduces the total payments (cost and credit structure improvement), the number of transactions (cost and system architecture improvement), and often, the risk in a transaction system (credit structure improvement). To illustrate this concept, if UKCorp1 owes UKCorp2 100 Pounds Sterling and UKCorp2 owes UKCorp3 100 Pounds Sterling, then UKCorp1 could pay UKCorp3 100 Pounds directly thereby reducing the payments from 200 Pounds total to 100 Pounds, and the number of transactions from 2 to 1.

In addition to the need for speculative currency trading, there exists also a very substantial need for corporations to buy and sell foreign currency, for example, to pay overseas suppliers. Similarly, individuals travelling abroad or making foreign investments need to obtain foreign currencies as well. Currently, corporations and individuals will approach a bank or foreign currency vendor (such as American Express Inc.) to obtain foreign currency. The bank or foreign currency vendor will in turn often have obtained its stocks of foreign currency from other banks, in many cases having used an inter-bank trading system such as the Reuters or EBS systems. Because of the chain of intermediaries, the transaction cost of buying or selling foreign exchange in this way is quite high: this is reflected in the commission charged and the difference between the bid and the offer prices: a bank will typically sell foreign currency at a rate considerably higher than the rate at which it will buy it back. For small transactions, the difference can be as high as 8%, but is typically in the 4% area. For larger transactions, the difference is typically 5 basis points.

SUMMARY OF THE INVENTION

In accordance with a first aspect of the present invention, a computer based system which enables a party and counterparty to be efficiently matched, comprises a first computer terminal into which the party inputs details of a potential first financial transaction, a second computer terminal into which the counterparty inputs details of a potential second financial transaction, a computer network connecting the first and second terminals; characterised in there being a computer program arranged to determine a net payment position if both the first and second transactions were to occur and to complete each transaction on the basis of the net payment position.

This approach can be contrasted with conventional netting, in which a transaction is completed and only subsequently does netting occur to reduce the number and size of payments. Typically, in the present invention, there might be several party/counterparty pairs in a connected series of transactions such that only by combining all of the connected transactions are all of the parties and counterparties satisfied in whole or part. The Internet may comprise some of the network connecting the first and second terminals.

In one embodiment, the first and second financial transactions relate to the sale or transfer of property and financial property, such as currency, foreign exchange, treasury bills, equity, concert tickets, and commodities in there various incarnations. The term 'financial property' is used in this patent specification to embrace any and all financial products which are traded by financial institutions, and therefore includes, without limitation, derivatives, options, debentures, bonds as well as the foreign exchange, treasury bills, and stocks and shares referred to above.

In another embodiment, the system handles the sale of contractual rights; and in a further embodiment, the sale of tangible property.

Preferably, in any of the above aspects or embodiments, the program is designed to identify and complete transactions, using a searching engine and methodology to discover the match; a transactions aging methodology and order of operations to prioritise the parties in the queue; and a matching algorithm to net the parties by way of a unique multilateral netting 'hybrid' procedure. This prioritises the series of transactions, which will fully satisfy at least one party.

For example, the computer based system may be adapted for foreign exchange transactions involving several different currencies, in which a program allocates to each currency a unique identifier with the property that each possible combination of currencies to be bought and sold by all parties and counterparties is uniquely identifiable by a combination identifier derived from the unique identifiers of each currency in a combination. The unique identifier can be an assignment value number in the form $10^N$, with N being different for each currency: the assignment value combination identifier for a given combination of currencies is then calculated by adding the unique identifiers for each currency in that combination. A match between a combination of currencies to be bought and a combination of currencies to be sold is identified by a program able to calculate combination identifiers for all possible combinations to be bought and to be sold and to identify a match where a combination identifier for a combination to be sold equals a combination identifier for a combination to be bought.

In a second aspect of the present invention, there is provided a method of completing a foreign exchange transaction for a party, comprising the steps of:

(a) the party defining a foreign exchange requirement using a web browser;

(b) sending the requirement via the Internet to a server; and (c) processing that requirement using a computer program arranged to determine a net payment position between the party and a counterparty and to complete the transaction between the party and the counterparty on the basis of the net payment position.

In a third aspect, there is provided a server programmed to process a foreign exchange transaction between a party and a counterparty, in which the server is programmed to determine a net payment position between the party and a counterparty if the transaction were to occur and to complete the transaction between the party and the counterparty on the basis of the net payment position.

In a fourth aspect, there is a computer terminal acting as a client, in which the client accepts from a party a foreign exchange requirement and sends that requirement to a server as defined above.

In a final aspect, there is provided a method of obtaining foreign exchange comprising the following steps:

(a) a party requiring foreign exchange defines a foreign exchange requirement using a web browser;

(b) the party sends the requirement via the Internet to a remote computer which processes or enables the processing of that requirement using a computer program arranged to determine a net payment position between the party and a counterparty and to complete the foreign exchange transaction between the party and the counterparty on the basis of the net payment position; and (c) the party receives foreign exchange in satisfaction of its requirement.

These and other features of the invention will be more fully understood by reference to the following figures.

BRIEF DESCRIPTION OF THE FIGURES

The invention will be described in more detail with reference to:

FIGS. 2A, 2B and 2C which is a table showing how a FX netting 'hybrid' system can operate in accordance with the present invention;

FIG. 5, which illustrates the mechanics and benefits of transactions netting;

DETAILED DESCRIPTION OF THE PREFERRED EMBODIMENT

Figure 1:
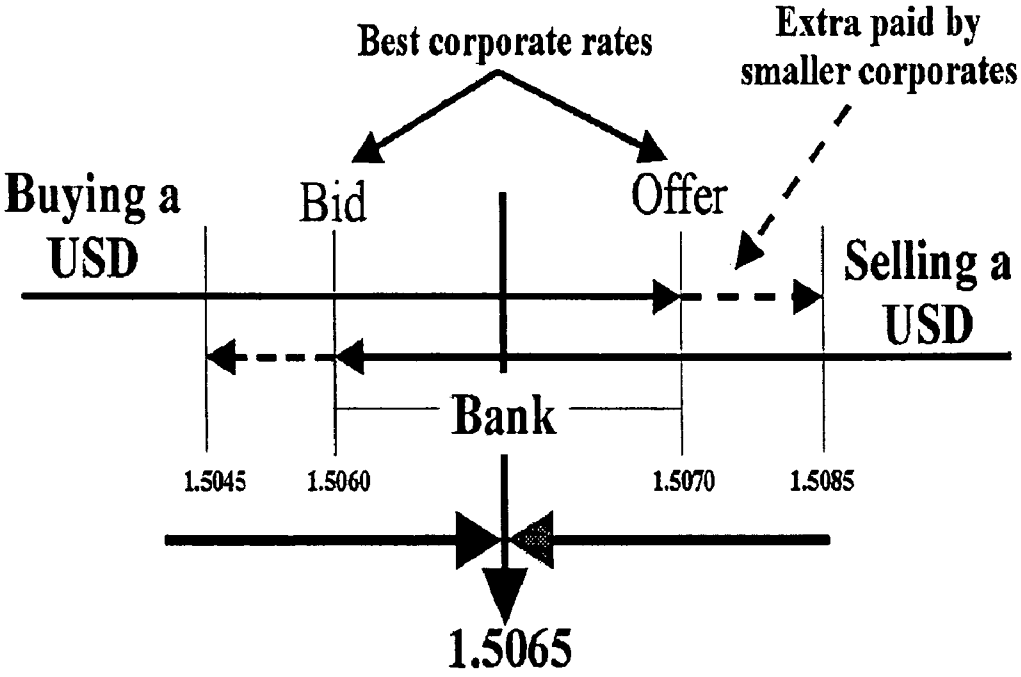
FIG. 1 which is a diagram representing the bid/offer pricing for USD priced in CAD.

During the course of this description, like numbers will be used to identify like elements according to the different views that illustrate the invention.

Currently, banks broker foreign exchange transactions, providing an intermediary to purchase and sell currency for both theirs' and their clients' accounts. For each transaction the bank garners the "spread", typically 5 basis points on large transactions and up to 4% on smaller transactions.

In the present invention, the appropriate underlying transactional software allows one end user of the foreign exchange (e.g. a first corporation, Corporation A, doing a cross border procurement) to liaise directly or indirectly with a counterparty, a second corporation, Corporation B, which requires the home currency of Corporation A. The bank brokering function, as it pertains to the financial instrument itself, can be reshaped; that is, the spread currently absorbed by the two sample corporations could be reduced or negated. Each party might therefore improve its cash position by one half the value of the spread that they would incur, for example on a 5 basis points spread, the corporation would improve its position by 2.5 basis points. For smaller customers the savings on a percentage basis would be substantially greater.

Moreover, transactions could be executed in a multitude of dimensions: two way; three way; four way; etc, since the software would expose the transactional opportunities available to each of the clients. (This process is described in more detail in Appendices 1 & 3)

The overall system approach can best be understood through a sample problem:

Sample problem

Imagine the following:

1. That the spot price of CDN $ is U.S. $1.5363–1.5373 at Nov. 27, 1998.

2. That Corporation A is buying U.S. $1 M to purchase equipment at a cost of CDN $1,537,300.00. Corporation A. has CDN $1,536,800.00 on account with a bank for the transaction (note: this assumes that the bank provides the best rate to Corporation A).

3. That Corporation B has U.S. $1 M on account with the bank but requires CDN $1,536,300.00 to purchase raw materials.

If the bank matches its own funds to supply Corporation A with U.S. $1 M and Corporation B with CDN $1,536,300.00, then it makes a profit of $1,000.00 per $ million transacted. Although $1,000 is a very small amount in the context of a significant $1 M transaction, the total global volume of such transactions is extremely large, so that the cumulative profits to banks are very substantial.

In the present invention, the following occurs: Corporation A and B agree before transacting that they will do so at an exchange rate that is the mid-point of the posted Interbank rate, for example, the Interbank highest bid, lowest offer at the appropriate time. This is a fair compromise for each participant. Hence, the transaction can be completed automatically, rapidly and efficiently. The party and counterparty each deposit the funds needed to execute a transaction with a financial institution; the funds are preferably pre-cleared and are not marginable through the system. A sophisticated computer program determines that the party and counter-party are taking reciprocal positions, which can be matched against each other and instructs the relevant financial institutions to transfer the required foreign exchange as, in effect, a swap. By matching Corporation A with Corporation B, each of their positions is improved by $500.00 per million, less a transaction fee to an intermediary of perhaps $50.00 per side. The result is that Corporation A receives U.S. $1 M for $1,536,750 per million; a saving of $450.00 per million; Corporation B Receives $1,536,850 for U.S. $1 M; an improvement in profit of $450.00. The system has in effect reduced the spread to 1 basis point. The spread can theoretically be reduced to just short of zero since the present invention operates efficiently and automatically. This example works because of the exactly matching reciprocal requirements of the parties. In practice, that will rarely happen and some sort of netting will be required.

The fundamental netting concept applied in this embodiment is that a computer is programmed with information relating to a party and counterparty transaction, to determine a net payment position if both the first and second transactions were to occur and to actually complete each transaction on the basis of the net payment position.

This approach can be contrasted with conventional netting, in which a transaction is completed and only subsequently does netting occur to reduce the number and size of payments. Typically, there might be several party/counterparty pairs in a connected series of transactions in the present embodiment.

Multilateral Netting Example

In the present system, it will be seen that the netting step is not simply a stage subsequent to but independent from the underlying exchange transaction, performed for accounting simplicity to reduce the numbers and sizes of cross-payments. Instead, it is an integral part of the underlying exchange transaction between party and counterparty. This is most clearly emphasised when considering a multi-party exchange of currencies. Take, for example, a situation in which there are 3 Corporations—A, B and C. A has CAD and needs JPY; B has JPY and needs USD; C has USD and needs CAD. The exact needs are shown in FIG. 2A. A cannot satisfy its requirements in whole or in part by dealing with B exclusively. However, if C can be "linked" into the transaction, all three corporations can be satisfied to the value of the smallest available currency. (A more detailed example with multiple parties and jurisdictions is available for review in Appendices 1, 2, and 3).

We assume that the mid-point of Interbank B/O at a point in time is as follows: 1.53675 CAD; 1 USD; 88.7755 YEN; (i.e. all numbers are relative to the USD base currency).

The desired amounts indicated on FIG. 2A reflect the mid-market value of the available currency. The post-match situation using this embodiment is shown on FIG. 2B.

It will be noted that the limiting factor in this match example was the availability of CAD for JPY.

The embodiment uses a "currency link" to match partially or fully the desired quantities of the match. A currency link is created using the source currency and the beneficiary (desired) currency for a series of transactions. FIG. 2C illustrates a simple three-way currency link.

Note, that if, for example, Party C wanted a currency other than AAA, say DDD, there would not be a currency link from which to synthesize a transaction. A link is therefore defined as (A to B; B to A); or (A to B; B to C; C to A); or (A to B; B to C; C to D; D to A) etc. A mathematical relationship at a point in time therefore exists between the currencies. Another example is A to C, B to A and C to B.

The distinction from traditional netting programs is threefold. First, netting in the present embodiment happens in "real-time", not at a fixed point in time post transaction for various parties, none of which are necessarily the same from one "link" to the next, and consequently, from one "match" (whole or partial) to the next. Second, the program is designed to seek out the "currency linking" through a combination of user defined parameters and system transaction rules. As complete matches occur (as in A above), the matched party drops out of the matrix or queue. The program seeks out the next currency links based on a set of transactions rules to fulfill wholly or partially the next match. Third, traditional netting occurs on completion of a series of transactions. For example, if Party A is obligated to pay Party B three units of a currency and Party B is obligated to pay Party C three units of a currency, a netting transaction would have Party A pay Party C three units of currency directly. In this embodiment, transactions are synthesized by matching source (available) currency to beneficiary (desired) currency requirements. As such the transaction could be deemed a netting 'hybrid'.

Figure 3A:
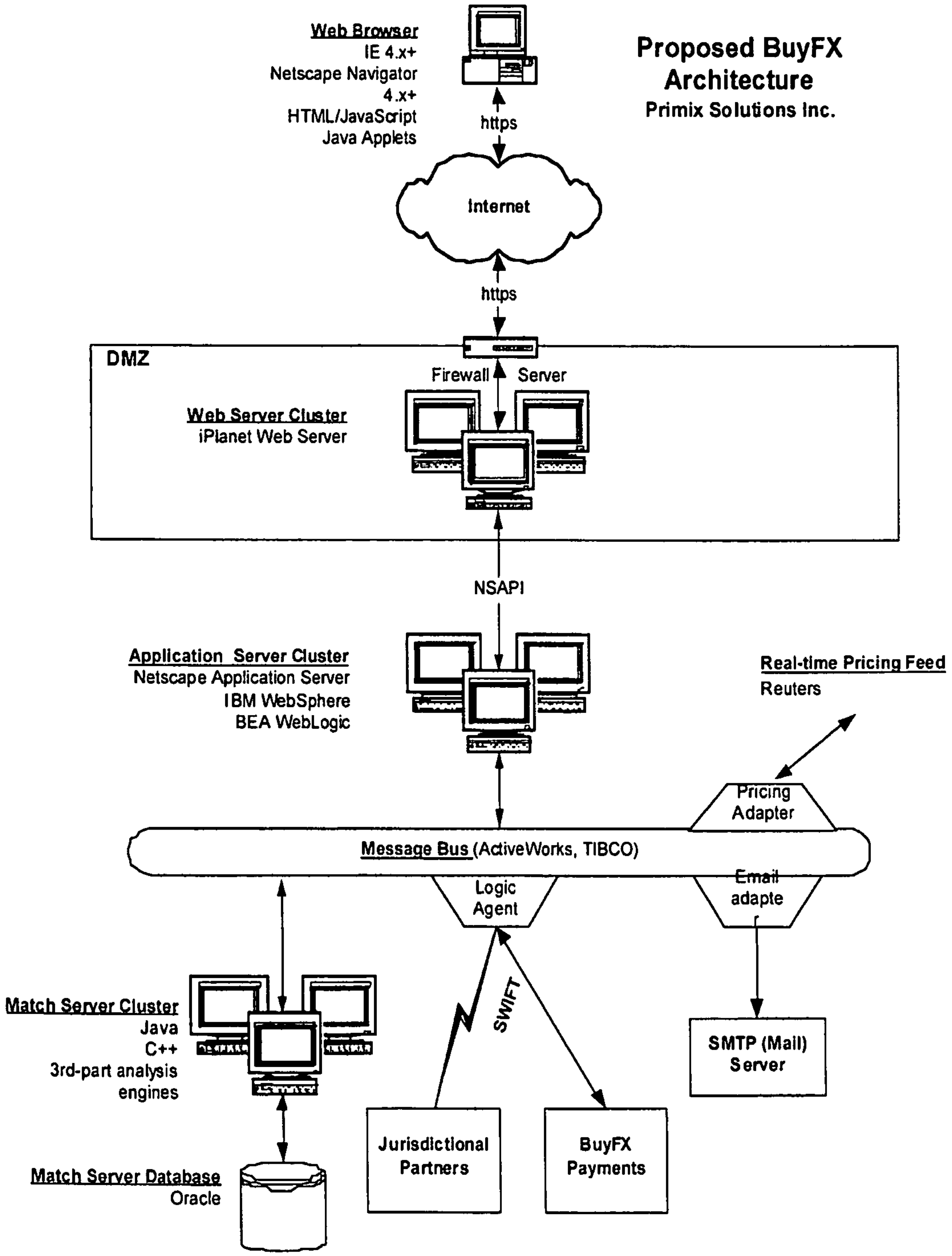
FIGS. 3A and 3B, which are schematic depictions of a computer based system according to this invention which enables buyers and sellers of foreign exchange to be efficiently matched; an d FIG. 4, which is a schematic representing the key steps in the inventive system as applied to FX matching.
Figure 3B:
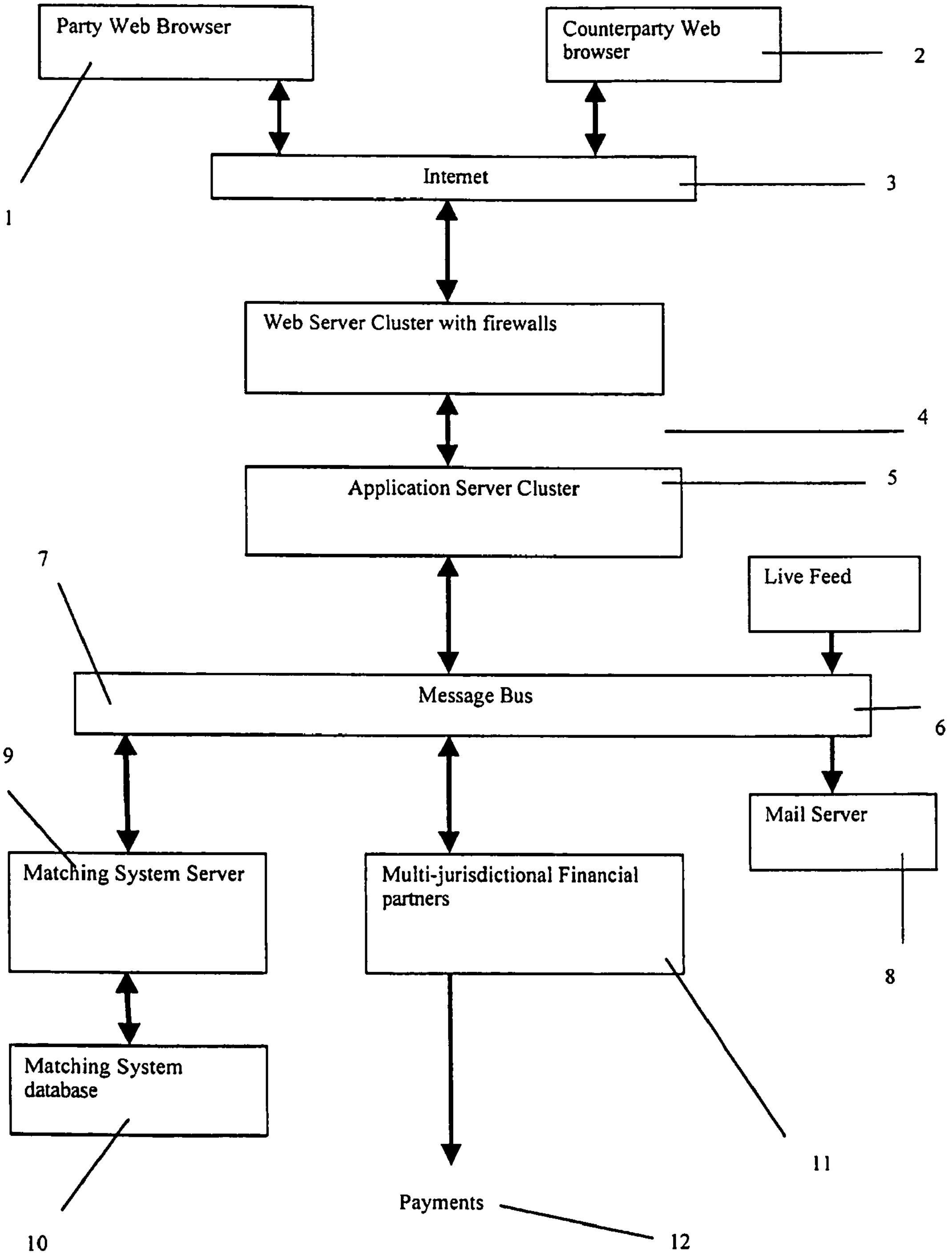

The present system may be further understood with reference to FIGS. 3A and 3B, which each show a schematic of the major elements in a foreign exchange matching system in accordance with the present invention. FIG. 3A is an actual proposed architecture schematic for an FX embodiment prepared by Primix Solutions Inc; the embodiment is called 'BuyFX'. The functions of the major blocks in FIGS. 3A and 3B are the same and are as follows: the party and counterparty each interact with the foreign exchange matching system using their web browsers (1, 2), which communicate via the Internet 3 with a conventional Web cluster/firewall 4 connected to an application server cluster 5 running Netscape Application Server, IBM WebSphere or BEA WebLogic. Cluster 5 is connected to a message bus 7, such as ActiveWorks or Tibco. The message bus 7 is connected to a live data feed 6, which provides continuous and up to date pricing information. A Reuters or Bloomberg feed could be used. Message bus 7 is also connected to a mail server 8 which communicates with various entities, including the party and counterparty.

Message bus 7 is also connected to the matching system server 9, which runs a Java or C++ program calculating not only the mid-point prices (and related spreads, if applicable) using data from the live feed 6 but also identifying where netting opportunities exist to enable a currency match to occur and the nature of the netting. Matching System server 9 is connected to an Oracle database 10. Message bus 7 is connected to the various system financial partners 11 (typically one, but not limited to one, in each jurisdiction whose currency is available for matching through the system). These are typically banks or deposit taking institutions. These partners actually take the payment from and make payments 12 to each party and counterparty in the amounts defined by the matching system server 9.

Figure 4:
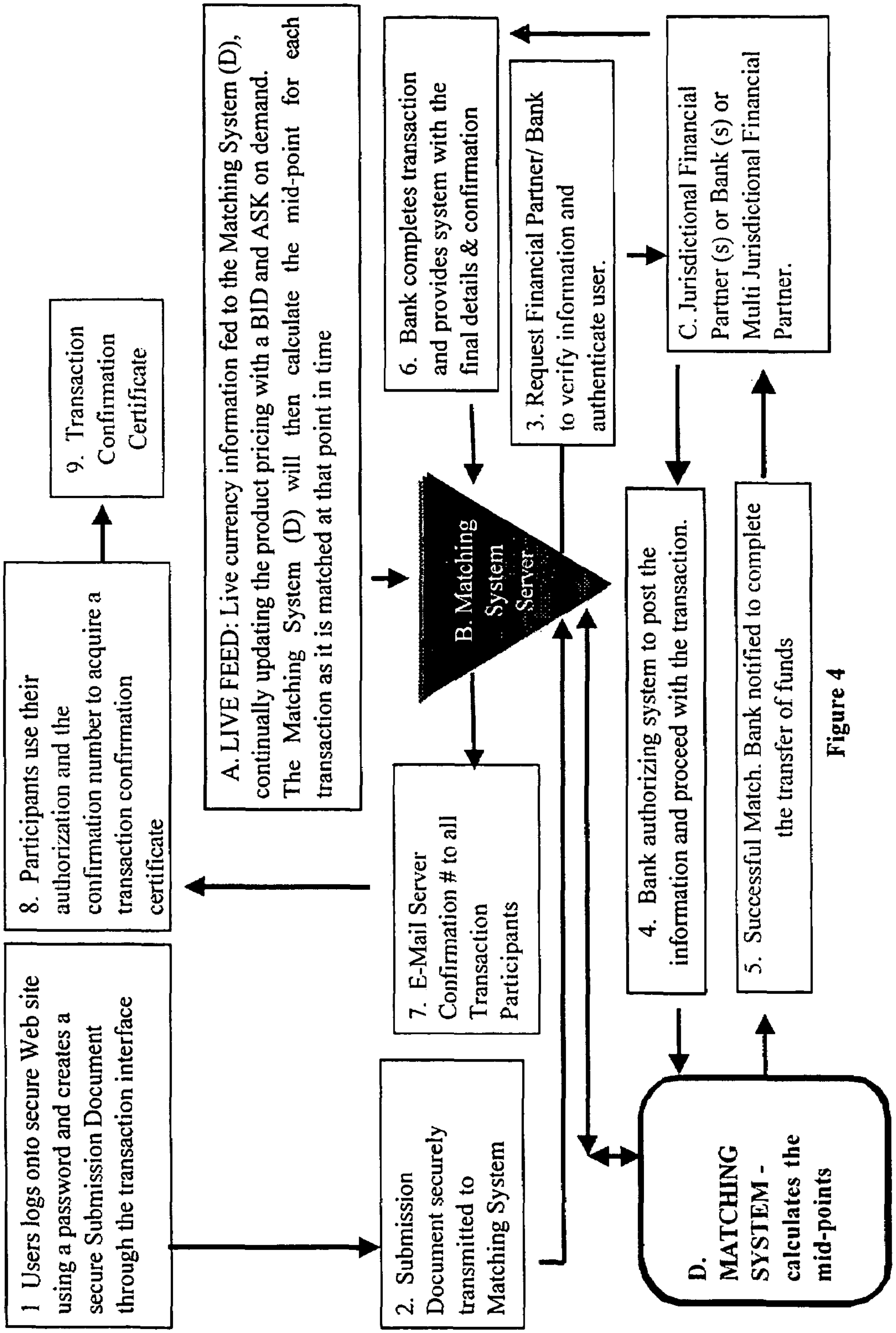

Reference should now be made to FIG. 4, which is a step by step walk through the process. FIG. 4 includes, but is not limited to, the denoted steps to execute a transaction. At step 1, a party with a need for foreign exchange logs onto a secure web site using its browser. Initially, the party has to complete a customer profile and user authentication. This involves the following steps: On entering the secure FX Matching System web portal, the customer has to:

(A) Register with the FX Matching System and its jurisdictional banking partners in a secure environment (if a new user), or (B) Authenticate its identity with a user name and password (if an existing user).

(C) If a new user, it also has to enter various administrator-defined restrictions-user restrictions, currency restrictions, volume restrictions e.g. User "XXXX" can transact in currency "XXX" and "YYY" only, in volumes not to exceed "XXXXXX".

Once authenticated as a user, the customer will be able to complete a secure submission document using its Web browser (Step 1). This document enables a user to:

(A) List, in a secure environment, commonly used source accounts and beneficiary accounts.

(B) Enter an electronic funds transfer request, with funds moving from a source account to a beneficiary account at a jurisdictional banking partner, if necessary.

Once its funds have been deposited and the cleared funds are "held" by a jurisdictional banking partner, the customer is able to 'post' funds using the browser based submission document as follows:

(A) By requesting a conversion on a defined source amount (e.g. the customer has a source quantity of $1 M USD which it requires to be converted to CAD), or (B) By requesting a beneficiary amount, the computer program will calculate the quantity of source funds required, utilizing a "buffer percentage" to account for potential currency fluctuations. The "buffer percentage" is a convenience feature for customers and will be calculated on a currency specific basis at two standard deviations of the daily fluctuation of the currency.

The secure submission document also allows each user to define the kind of transaction required. Examples of user-defined functionality include, but are not limited to, the following:

(A) 'Match'—the exchange transaction is completed as and when reciprocal funds become available in whole or in a series of partials for a customer to fulfil a currency order; this process can be time-sensitive. Implicit in the Match order is end of day execution of any unfilled balances, unless the customer has his own beneficiary account and elects to bypass that option;

(B) 'Match (All or none)'—the exchange transaction is completed only as and when a complete block of currency (as a series of partials or in one reciprocating block) becomes available to fulfill a currency order; (again, this can be time-sensitive);

(C) 'Match and Market (M & M's)'—a time sensitive order to fill the customer currency requirement with as much "matched" currency as is available during a user-defined period of time, with the option of executing the balance at the prevailing market rate with a banking partner or financial institution;

(D) 'Market'—an order allowing a customer to bypass the matching process and go directly to a jurisdictional partner for execution; this can be time-sensitive;

(E) 'Special Liquidity'—certain corporate partners, and, in some circumstances, regular customers will be able to submit orders at preferred rates to augment liquidity. "D-SL" orders never have precedence over regular "Direct" orders.

The Submssions Document is then securely transmitted (step 2) to the Matching System Server (B). The Matching System Server (B) then requests (step 3) the appropriate financial institution (C) to verify the information given by the party (including the availability of funds) and to authenticate the user from the financial institution's perspective. An account held with this multi jurisdictional financial partner(s) serves nothing but a transactional purpose through which funds are matched and distributed. The multi jurisdictional financial partner(s) accepts funds on account in the currency by which they were deposited. Correspondingly, this institution delivers funds to the customer in the beneficiary currency at the prescribed rate of exchange. All currency exchange is electronic so that no physical securities are required for clearing.

Once the financial institution (C) has confirmed that the user has the required funds to be exchanged it in effect freezes those funds, and then authorises the matching system (step 4) to post the required information and proceed with the transaction. The Matching System (D) then performs the netting identification process illustrated at FIG. 2B, using the mid-point prices it calculates using the data from live feed (A). Matching System (D) uses the following order prioritisation feature. In order to prevent one company and/or transaction from "locking out" other customers by placing a substantial order in relation to the available liquidity, customers will be able to place orders to a maximum size of "X" USD equivalent. The software will accept volumes in excess of this size. These will be automatically processed into a series of smaller transactions, determined by the Matching System (D) and contingent on the liquidity of the currency. Execution of these smaller transaction volumes will occur in sequence with the initial block being completed on a "first in, first out", followed by the next Matching System (D) customers in that currency, if any, on a FIFO basis; followed by the second block from the transaction; followed by the next customers in that currency, if any, and so on until the cumulative volume is filled. This prevents one customer from monopolizing any one currency to the detriment of other customers.

Where a successful match has occurred, the Matching System (D) notifies the various financial institutions to complete the funds transfer. More exactly, transactions are aggregated by Matching System (D), reconciled, and recorded to one central file per jurisdictional financial institution. The "batched" files are transmitted to the jurisdictional partner (step 5).

Notification arises through the Matching System (D) issuing an 'International Payment Instruction'. This is an order to a financial partner to record payment instructions to a customer defined beneficiary account;

Issuance of the 'International Payment Instruction' will occur under, but will not be limited to, the following conditions:

(A) When a customer is "matched" fully (B) When a customer is filled at the end of the day (C) When a "Match and Market" order has been fulfilled.

(D) If customer selects "Market" or "Match (All or none)" order.

(E) If a customer elects to carry an order over a number of days, until that order is filled in its entirety, the direction to pay option to a Payee Account remains unavailable. In that circumstance, the customer must maintain his own beneficiary account.

In addition to handling International Payment Instructions, the system can equally well handle Domestic Payment Instructions—for corporations who seek to transfer funds domestically.

In addition to issuing the International Payments Instruction, the Matching System (D) records the transaction details and time-stamps them. Pricing is also screened by the Matching System (D) for anomalous trades to ensure transaction integrity. Matching System (D) also causes an e-mail customer notification of a match to be issued, pending final payment and settlement.

Payment instructions are then confirmed, aggregated, and reconciled at the financial partner. Payment is subsequently effected (step 6) to the denoted beneficiary accounts (payee or customer). Each jurisdictional banking partner will release funds at the earliest available opportunity after the daily batching function. Confirmation details are recorded for transmission to customers; confirmation email and online transaction reporting details are transmitted to each customer (step 7). Call centre functionality allows customer to gain transaction details should their ISP be experiencing technical details. At step 8, each customer can obtain a transaction confirmation certificate (Step 9). The transaction is now fully completed.

There are various additional aspects to the FX Matching System, which are not illustrated. For example, a product for individuals (business travelers) is available; as is a corporate wholesale product for intermediary exchange requirements; and a "market" product for blue-chip multinationals. The transaction size in these incarnations may dictate the transactions "fee" for executing a currency match; the program could, but does not have to automatically categorize the trade into the appropriate product with the appropriate rate scale.

Another use of the system is as an intra/inter corporate netting and money management facility (see The Mechanics of Netting FIG. 5), in which currency requirements can be met as the intra corporate currency becomes available in other jurisdictions.

A hedging facility for foreign exchange exposure may also be included, in which matched forwards can be offered by the jurisdictional financial partner.

In addition, exposure positions are available to the multi jurisdictional financial partner(s) to mitigate systematic risk with one another.

The system can be implemented as a series of scalable products available for distribution through many different channels through the Internet; the customer may enter the system directly through the denoted web site to transact; the customer may enter via the web site of our multi jurisdictional partner(s) in a co-branded product, or the customer may enter via the web site of a multi jurisdictional partner in a "partner-branded aka white-branded" or non-branded interface. For the retail individual, an affiliation between the present system and a courier and travelers cheques company is possible. This enables a transaction to be completed anywhere in world with the traveler's cheque couriered directly to the individual. This is envisaged as a premium service delivered via the Internet.

As explained above, the system can provide cross-border settlement of accounts, converted to the currency of choice, at exchange rates that represent the closest to fully efficient currency markets. This is particularly advantageous for the small/medium corporate user.

Clearing Transactions

In a preferred embodiment, there is a central clearer (or a group of clearers, presumably financial institutions), with access to the jurisdictions in which currency is both sourced and required. This could be a single financial institution or trustee, or a group of financial institutions or trustees which can secure the transactions. An account held with the clearing body serves nothing but a transactional purpose through which funds are matched and distributed. The central clearer or its affiliates should have the ability to accept funds on account or with a financial institution in the currency by which they were deposited. Correspondingly, this institution delivers funds to the customer in the beneficiary currency at the prescribed rate of exchange. All currency exchange is electronic and no physical securities are required for clearing.

Further detailed aspects of an implementation are contained in the following appendices, in which:

Appendix 1, which details the searching methodology and algorithm; and

Appendix 2, which details the transaction aging procedure and the order of operations; and Appendix 3; which details the matching algorithm and netting (hybrid) procedure

APPENDIX 1

The Searching Methodology and Algorithm

1. Each currency is assigned a unique base ten exponential value henceforth as an Assignment Value (AV) see Table 1.0 below. Example: GBP-AV 1.E+02
2. Source Currency Assignment Value (SCAV) e.g. SCAV for USD=1.E+00 Beneficiary Currency Assignment Vale (BCAV) e.g. BCAV for CAD=1.E+01 see Glossary of Terms

TABLE 1.0

Assignment Values

| # | Currency | Values | Exponential |
|---|---|---|---|
| 1 | USD-AV | 1 | 1.E+00 |
| 2 | CAD-AV | 10 | 1.E+01 |
| 3 | GBP-AV | 100 | 1.E+02 |
| 4 | JPY-AV | 1000 | 1.E+03 |
| 5 | EUR-AV | 10000 | 1.E+04 |
| 6 | AUD-AV | 100000 | 1.E+05 |
| 7 | CHF-AV | 1000000 | 1.E+06 |
| | | 1000000 | |
| 8 | ZAR-AV | 0 | 1.E+07 |

3. To distinguish between currency combinations, one aggregates the assignment values of the underlying currencies. Example CAD/GBP/EUR=10110. No other currency grouping can generate this assignment value. Each grouping has its own unique assignment value that is a single binary number derived from a unique binary identifier assigned to each currency, as clearly seen from table 1.0 and the examples below.
4. Key to the process is that no combination of assignment values can be aggregated to equal the assignment value of any other currency. A base ten searching mechanism provides this characteristic.
5. Using AVs from Table 1.0, one can generate matches mathematically. See Example 1.0.
6. The searching mechanism has a finite number of combinations that can be easily defined by Formula 1.0.
7. Formula 1.0: Total Combination Calculation A total of combinations T(n, x) is the number of total combination identifiers and is calculated by the formula:

$$T(n, x)=C(n, x)+C(n, x-1)+C(n, x-2)+\ldots+C(n, 2)$$

where n is a positive integer that represents the number of currencies corresponding to a current currency trade, x is a positive integer such that $x \geqq 2$ and $x \leqq n$, and wherein C(n, x) represents one of the total combinations given n and x;

8. Examples: Eight and Nine Currency Environments

Therefore, in an eight currency environment, the total number of combinations equals:

$$T(8,8)=C(8,8)+C(8,7)+C(8,6)+C(8,5)+C(8,4)+C(8,3)+C(8,2)$$

$$T(8,8)=1+8+28+56+90+56+28$$

$T(8,8)=267$ maximum combinations assuming we accept all possible links.

In a nine currency environment, the total number of combinations equals:

$$T(9,9)=C(9,9)+C(9,8)+C(9,7)+C(9,6)+C(9,5)+C(9,4)+C(9,3)+C(9,2)$$

$$T(9,9)=1+9+36+84+126+126+84+36$$

$T(9,9)=502$ maximum combinations assuming we accept all possible links

9. Note that the above equation is terminated at C(n,2) as two items at least are necessary to generate a match.
10. Note that the above equation can readily generate the number of available combinations should BuyFX.com wish to limit the matching procedure to any maximum number of participants. For example, BuyFX.com could have a 20-currency environment with a maximum of 6 participants to a transaction; mathematically the number of possible combinations to reflect these parameters can be described as:

$T(n,x)=C(n,x)+C(n,x-1)+\ldots+C(n,2)$ where n is the number of available currencies and x is the maximum number of participants in any one transaction where n is a positive integer that represents the number of currencies corresponding to a current currency trade that in this example is 20, x is a positive integer that in this example is 6 and wherein C(n, x) represents one of the total combinations given n and x;

For a 20 currency environment, with a maximum of 6 participants to any one transaction:

$$T(20:6)=C(20,6)+C(20,5)+C(20,4)+C(20,3)+C(20,2)$$

$$T(20:6)=38,760+15,504+4,845+1,140+190$$

$T(20:6)60439$ possible combinations

11. Source Currency Assignment Value (SCAV) is compared to the Beneficiary Currency Assignment Value (BCAV) to generate the match(es).

Where the SCAV=BCAV for the same subset of clients, a match exists.

12. Example 1.0

Numerical Example: Searching Methodology

Assumptions

| | | | | |
|---|---|---|---|---|
| a. | Randomly entered data points denoting source and beneficiary currency req'ts. | | | |
| b. | All transactions entered at time t = 1.0; hence no transaction in the example has precedence based on time. | | | |
| c. | Source Currency | USD | | |
| | Beneficiary Currencies | CAD | CHF | |
| d. | Source Currency | CAD | | |
| | Beneficiary Currencies | JPY | AUD | |
| e. | Source Currency | GBP | | |
| | Beneficiary Currencies | USD | EUR | |
| f. | Source Currency | JPY | | |
| | Beneficiary Currencies | GBP | ZAR | |
| g. | Source Currency | EUR | | |
| | Beneficiary Currencies | USD | | |
| h. | Source Currency | AUD | | |
| | Beneficiary Currencies | EUR | | |
| i. | Source Currency | CHF | | |
| | Beneficiary Currencies | USD | GBP | ZAR |
| j. | Source Currency | ZAR | | |
| | Beneficiary Currencies | EUR | | |

13. The above observations could be illustrated numerically as in Table 1.1

TABLE 1.1

| | | Assumptions Denoted in Table Form with Corresponding Assignment Values | | | | | | | |
|---|---|---|---|---|---|---|---|---|---|
| | | SCAV | | | | | | | |
| | | USD | CAD | GBP | JPY | EUR | AUD | CHF | ZAR |
| | BCAV | 1.E+00 | 1.E+01 | 1.E+02 | 1.E+03 | 1.E+04 | 1.E+05 | 1.E+06 | 1.E+07 |
| USD | 1.E+00 | | | 1.E+00 | | 1.E+00 | | 1.E+00 | |
| CAD | 1.E+01 | 1.E+01 | | | | | | | |
| GBP | 1.E+02 | | | | 1.E+02 | | | 1.E+02 | |
| JPY | 1.E+03 | | 1.E+03 | | | | | | |
| EUR | 1.E+04 | | | 1.E+04 | | | 1.E+04 | | 1.E+04 |
| AUD | 1.E+05 | | 1.E+05 | | | | | | |
| CHF | 1.E+06 | 1.E+06 | | | | | | | |
| ZAR | 1.E+07 | | | | 1.E+07 | | | 1.E+07 | |

14. AV Matches

Assumptions: In this example, all transactions aged identically at t=1

| Assumptions: In this example, all transactions aged identically at t = 1 | | | | | | | | | |
|---|---|---|---|---|---|---|---|---|---|
| Match | 1 | 1.E+01 | 1.E+05 | | | 1.E+00 | 1.E+04 | | |
| SCAV | | 110011 | USD,CAD,EUR,AUD | | | | BCAV | | 110011 |
| Match | 2 | 1.E+06 | | | | | | 1.E+00 | |
| SCAV | | 1000001 | USD,CHF | | | | BCAV | | 1000001 |
| Match | 3 | 1.E+01 | 1.E+03 | 1.E+00 | 1.E+02 | | | | |
| SCAV | | 1111 | USD,CAD,GBP,JPY | | | | BCAV | | 1111 |
| Match | 4 | 1.E+06 | | | | 1.E+00 | | 1.E+07 | 1.E+04 |
| SCAV | | 11010001 | USD,EUR,CHF,ZAR | | | | BCAV | | 11010001 |

15. By comparing the aggregated assignment values of the source currencies against the beneficiary currencies, one can discover the matches. Where the values are identical, there is a match.

16. Mathematically, this is illustrated as follows:

$$SCAV-BCAV=0 \quad \text{(Formula 1.1)}$$

Matches: Denoted by source and beneficiary assignment values being equal.

| | | | | | |
|---|---|---|---|---|---|
| a. | Source Value | 110011 | | | |
| | Beneficiary Value | 110011 | | | |
| | Match: USD | CAD | EUR | AUD | |
| b. | Source Value | 1000001 | | | |
| | Beneficiary Value | 1000001 | | | |
| | Match: USD | CHF | | | |
| c. | Source Value | 1111 | | | |
| | Beneficiary Value | 1111 | | | |
| | Match: USD | CAD | GBP | JPY | |
| d. | Source Value | 11010001 | | | |
| | Beneficiary Value | 11010001 | | | |
| | Match: USD | EUR | CHF | ZAR | |

17. Since the subset of required assignment values is finite; the searching procedure is easily executable.

18. The system is easily scalable with the addition of currencies see #4 above. The maximum number of combinations is finite and can be defined. As this relates to CPU capacity, the requirements can be estimated with confidence.

APPENDIX 2

Transaction Aging Procedure and Order of Operations

1. While the Searching Algorithm provides a very clear methodology to exposing matches mathematically. Consideration must also be given to:
   i. the Transaction Aging Process
   ii. the order of Operations
2. The Transaction Aging Process is a time-based order management procedure through which entries are prioritized on a first in, first out basis, subject only to the parameters and limitations of either the BuyFX.com transactions Rules or User Defined Parameters.
3. Order of Operations is a combinati9n of Transaction Rules and User Defined Parameters, which necessitate unique treatment of the data entry in question. For example, if a customer tags the "All or none" order, the system must provide for this restriction by ensuring that the complete execution of the order can occur prior to engaging this entry in any transaction.
4. The Transaction Aging Process
   i. Given that the user entry requires no special treatment in relation to the BuyFX.com Transactions Rules, and that the entry is not tagged with a user defined defined limitation, precedence of one entry over another is exclusively time based. In other words, the first entry into the system will, ceteris parabis, have priority over any subsequent entry.
5. Example 1.0

TABLE 1.0

| Assignment Values | | | |
|---|---|---|---|
| # | Currency | Values | Exponential |
| 1 | USD-AV | 1 | 1.E+00 |
| 2 | CAD-AV | 10 | 1.E+01 |
| 3 | GBP-AV | 100 | 1.E+02 |
| 4 | JPY-AV | 1000 | 1.E+03 |

Randomly entered data points denoting the following transactions conditions:

At t=1.0; USD-SC; CAD-BC, therefore SCAV=1, BCAV=10

At t=1.1; EUR-SC; USD-BC, therefore SCAV=100, BCAV=1

At t=1.2; CAD-SC; EUR-BC, therefore SCAV=10, BCAV=100

At t=1.3; USD-SC; EUR-BC, therefore SCAV=1, BCAV=100 where SC is Source Currency & BC is Beneficiary Currency

6. Transaction Aging Procedure

| | SC | USD | CAD | EUR | JPY |
|---|---|---|---|---|---|
| | SCAV | 1 | 10 | 100 | 1000 |
| BC | BCAV | | | | |

-continued

| | SC | USD | CAD | EUR | JPY |
|---|---|---|---|---|---|
| USD | 1 | | | T = 1.1; AV = 1 | |
| CAD | 10 | T = 1.0; AV = 10 | | | |
| EUR | 100 | T = 1.3; AV = 100 | T = 1.2; AV = 100 | | |
| JPY | 1000 | | | | |

7. AV Matches by Age

| | | | |
|---|---|---|---|
| I. | At T = 1.0 | No match | |
| II. | At T = 1.1 | No match | |
| III. | At T = 1.2 | Match | SCAV = BCAV = 111 |
| IV. | At T = 1.3 | Match | SCAV = BCAV = 101 |

Notes:
I. Match at T = 1.3; if USD and EUR remaining in the queue after Match at T = 1.2.
II. If USD or EUR supply exhausted at T = 1.2, Match at T = 1.3 will not occur.
III. If observation at T = 1.3 occurs prior to T = 1.2; Match AV = 101 will have priority over Match AV = 111. In this example Match AV = 111 will not occur as one, of either, USD or EUR would be exhausted.

8. The Factors Influencing the Order of Operations
   Time Stamp—per Aging Rules above
   Size—parceling if necessary to ensure customer fulfillment and prevent "monopolization" by any one customer.
   Type of Transaction—Match; Match and Market, Match (All or None),
   Market, Special Liquidity
   User Defined Parameters—price limits, duration, etc.

APPENDIX 3

The Matching Algorithm

1. By combining the BuyFX.com Searching Algorithm with the Transactions Aging Procedure, AV Matches can be discovered. (see BuyFX Searching Algorithm and BuyFX transaction Aging Methodology & Order of Operations)
2. When an AV Match is discovered via the BuyFX Searching Algorithm, at least two clients will be party to the transaction. The limiting factor to the transaction will, therefore, be the least supply of currency (or the smallest Source Currency Quantity or SCQq) among the parties to the transaction. eg. Assume AV Match=101 (GBP and USD); one client has 100,000 USD for GBP and another has 100,000 GBP for USD; USD/GBP=0.62225: the limiting factor to this transaction is the SCQq if 100,000 USD. Therefore, the client with SC=USD and BC=GBP will receive all of his desired GBP and drop from the queue. All other parties will remain in the queue subject to user parameters and transaction rules.
3. To calculate the amount of currency allocated to each of the parties in a transaction:
   A. Each supply of currency is denoted in a common or base currency equivalent form. Since USD is the global standard against which all currencies are typically quoted, USD will be used as the base currency for these calculations. Formula 1.0 describes a currency in terms of the base currency, in this case, USD.

Formula 1.0:

$Q^{USD}$(SC in Base terms)=SCQ/SC FX Rate as against the Base Currency or $Q^{USD}$=SCQ/$R^{USD/SC}$ Example: To calculate JPY in USD terms,

R=109.45, SCQ=109,450 JPY $Q^{USD}=SCQ^{JPY}/R^{USD/JPY}$ $Q^{USD}$=109,450/109.45=1000 USD.

B. The SCQq is determined, thereby defining the limiting source and quantity of currency against which the other participant volumes can be calculated. Each party to the transaction will undergo the calculation denoted in Formula 1.1 to determine the supply of currency which that particular client will contribute to the transaction ($SCQ^T$)

Formula 1.1:

$SCQ^T$ (quantity supplied to the transaction)=SCQq× Source FX Rate as against the Base Currency or $SCQ^T=SCQq\times R^{USD/SC}$ Example: To calculate the volume of source currency contributed to a transaction.

If the SCQq=10 USD, and $R^{USD/GBP}$=0.62225, $SCQ^{TGBP}$=10*0.62225=6.2225 GBP Therefore, the client with SC=GBP would supply 6.2225 Pounds to this transaction and the client with BC=GBP would receive 6.2225 Pounds as a party to this transaction.

4. Consider the following example:
   - Client B has 15 CAD as Source Currency Quantity (SCQ) and requires X JPY as Beneficiary Currency Quantity (BCQ)
   - Client H has 3000 JPY as Cource Currency Quantity (SCQ) and requires Y CAD as Beneficiary Currency Quantity (BCQ)

Thre prevailing foreing exchange rates are noted in the Table below:

Sample Transaction

| Client | SCQ | FX Rate (see Table 7.1) | SCQ (in USD) Formula 1.0 | BCQ | BC | Residual $SCQ^R$ |
|---|---|---|---|---|---|---|
| B | 15 | 1.45425 | 10.31 | 1128.93 | JPY | 0 |
| H | 3000 | 109.45 | 27.41 | 15.00 | CAD | 1871.068 |

SCQq = 10.31 USD

Therefore,

Applying the calculation $SCQ^T=SCQq\times R^{USD/SC}$

Client B:

$SCQ^{T\ CAD}$=10.31×1.45425=15 CAD (therefore "B" provides 15 CAD to "H")

$BSQ^{T\ JPY}$=1128.93 JPY

Client H:

$SCQ^{T\ JPY}$=10.31×109.45=1,128.93 JPY (therefore "H" provides 1,128.93 JPY to "B")

$BCQ^{T\ CAD}$=15 CAD

Client B, holding the smaller USD equivalent position, can be executed in its entirety; 1128.932 JPY for 15 CAD.

Client H receives 15 CAD and remains in the queue having available 1871.068 JPY for the next counterparty.

5. To calculate the residual source funds $SCQ^R$ for the next applicable transaction, one need only subtract the $SCQ^T$ (the quantity supplied to the transaction) from the original SCQ.

Formula 1.3:

$SCQ^R=SCQ-SCQ^T$

Example: To calculate the volume of source currency remaining after a transaction.

If the SCQ=3000 JPY, and $SCQ^{T\ JPY}$=1128.93

$SCQ^{R\ JPY}$=3000-1128.93=1871.07 JPY therefore, the client with SC=JPY would be ready to supply at most, 1871.07 JPY to the next transaction.

6

A. All details of the transaction will be stored to a database for aggregation & "batch payment and settlement"

B. As currencies fluctuate against the USD, calculation will be generated from live data to supply the client with "real-time" competitive pricing.

7. Applying the BuyFX Algorithms and Procedures 7.1. Sample Foreign Exchange Rate Table Mid Point FX Rates

| Currency | Quotation | Mid-Point |
|---|---|---|
| $R^{USD/CAD}$ | 1.45375/475 | 1.45425 |
| $R^{USD/GBP}$ | 0.6220/25 | 0.62225 |
| $R^{USD/JPY}$ | 109.40/50 | 109.45 |
| $R^{USD/EUR}$ | 0.9860/65 | 0.98625 |
| $R^{USD/AUD}$ | 1.5830/40 | 1.5835 |
| $R^{USD/CHF}$ | 1.6270/75 | 1.62725 |
| $R^{USD/ZAR}$ | 6.3260/70 | 6.3265 |

Quotations as at Feb. 16, 2000

Note: Currency rates are dynamically reflected in the calculations in USD terms at any time T = match. The rates above are merely a static sampling for the purposes of this example.

7.2. Sample Currency Assignment Values

| # | Currency | Values | Exponential |
|---|---|---|---|
| 1 | USD-AV | 1 | 1.E+00 |
| 2 | CAD-AV | 10 | 1.E+01 |
| 3 | GBP-AV | 100 | 1.E+02 |
| 4 | JPY-AV | 1000 | 1.E+03 |
| 5 | EUR-AV | 10000 | 1.E+04 |
| 6 | AUD-AV | 100000 | 1.E+05 |
| 7 | CHF-AV | 1000000 | 1.E+06 |
| 8 | ZAR-AV | 10000000 | 1.E+07 |

7.3. Random Currency Entries using Table 7.2

| | SC | BC | SC-AV | BC-AV | SCQ |
|---|---|---|---|---|---|
| T = 1.0 | GBP | USD | 100 | 1 | 20 |
| T = 1.1 | CAD | JPY | 10 | 1000 | 15 |
| T = 1.2 | GBP | CAD | 100 | 10 | 10 |
| T = 1.3 | JPY | USD | 1000 | 1 | 800 |
| T = 1.4 | AUD | USD | 100000 | 1 | 30 |
| T = 1.5 | USD | EUR | 1 | 10000 | 35 |
| T = 1.6 | CAD | ZAR | 10 | 10000000 | 15 |
| T = 1.7 | JPY | CAD | 1000 | 10 | 3000 |
| T = 1.8 | EUR | GBP | 10000 | 100 | 30 |
| T = 1.9 | CAD | JPY | 10 | 1000 | 40 |
| T = 2.0 | EUR | CHF | 10000 | 1000000 | 25 |
| T = 2.1 | ZAR | GBP | 10000000 | 100 | 110 |
| T = 2.2 | CAD | AUD | 10 | 100000 | 19.5 |
| T = 2.3 | USD | GBP | 1 | 100 | 30 |

Where SC/BC is Source/Beneficiary Currency; AV is Assignment Value; Q is Quantity 7.4. Sample Initial SCQs and AV Matches

| Time | Client | SCAV | BCAV | AV-Match | Initial SCQ | Initial $Q^{USD}$ |
|---|---|---|---|---|---|---|
| T = 1.0 | A | 100 | 1 | N/A | 20 | 32.14 |
| T = 1.1 | B | 10 | 1000 | N/A | 15 | 10.31 |
| T = 1.2 | C | 100 | 10 | N/A | 10 | 16.07 |
| T = 1.3 | D | 1000 | 1 | N/A | 800 | 7.31 |
| T = 1.4 | E | 100000 | 1 | N/A | 30 | 18.95 |
| T = 1.5 | F | 1 | 10000 | N/A | 35 | 35.00 |
| T = 1.6 | G | 10 | 10000000 | N/A | 15 | 10.31 |
| T = 1.7 | H | 1000 | 10 | 1010 | 3000 | 27.41 |
| T = 1.8 | I | 10000 | 100 | 10101 | 30 | 30.42 |
| T = 1.9 | J | 10 | 1000 | 1010 | 40 | 27.51 |
| T = 2.0 | K | 10000 | 1000000 | N/A | 25 | 25.35 |
| T = 2.1 | L | 10000000 | 100 | 10000110 | 110 | 17.39 |
| T = 2.2 | M | 10 | 100000 | N/A | 19.5 | 13.41 |
| T = 2.3 | N | 1 | 100 | 101 | 30 | 30.00 |
| T = 2.3 | | | | 100111 | | |

The results of each subsequent client entry are recorded in 7.5 below.

7.5. Results of Sample Currency Entries

| Time | Client | Initial Position | $SCQ^R$ | Description |
|---|---|---|---|---|
| | | A | | |
| T = 1.7 | B (T = 1.1) | 15.0 CAD | 0 CAD | Client B receives 1128.93244 JPY |
| | H (T = 1.7) | 3000 JPY | 1871.068 JPY | Client H receives 15.0 CAD |

Client B requirement is executed in its entirety and Client B is removed from the queue.
Client H requirement is partially executed and Client H remains in the queue.

| Time | Client | Initial Position | $SCQ^R$ | Description |
|---|---|---|---|---|
| | | B | | |
| T = 1.8 | I (T = 1.8) | 30 EUR | 0 EUR | Client I receives 18.92776 GBP |
| | A (T = 1.0) | 20 GBP | 1.07224 GBP | Client A receives 30.41825 USD |

-continued

| Time | Client | Initial Position | $SCQ^R$ | Description |
|---|---|---|---|---|
| | F (T = 1.5) | 35 USD | 4.58175 USD | Client F receives 30 EUR |

Client I requirement is executed in its entirety and Client I is removed from the queue.
Client A requirement is partially executed and Client A remains in the queue.
Client F requirement is partially executed and Client F remains in the queue.

| Time | Client | Initial Position | $SCQ^R$ | Description |
|---|---|---|---|---|
| | | C | | |
| T = 1.9 | H (T = 1.7) | 1871.068 JPY | 0 JPY | Client H receives 24.86067 CAD |
| | J (T = 1.9) | 40 CAD | 15.13933 CAD | Client J receives 1871.068 JPY |

Client H requirement is executed in its entirety and Client H is removed from the queue.
Client J requirement is partially executed and Client J remains in the queue.

| Time | Client | Initial Position | $SCQ^R$ | Description |
|---|---|---|---|---|
| | | D | | |
| T = 2.1 | G (T = 1.6) | 15 CAD | 0 CAD | Client G receives 65.25529 ZAR |
| | L (T = 2.1) | 110 ZAR | 44.74471 ZAR | Client L receives 6.41826 GBP |
| | C (T = 1.3) | 10 GBP | 3.58174 GBP | Client C receives 15.0 CAD |

Client G requirement is executed in its entirety and Client G is removed from the queue.
Client L requirement is partially executed and Client L remains in the queue.
Client C requirement is partially executed and Client C remains in the queue.

E
Using Transaction Aging Rules,
Transaction E has priority over Transaction F.

| Time | Client | Initial Position | $SCQ^R$ | Description |
|---|---|---|---|---|
| T = 2.3 | A (T = 1.0) | 1.07224 GBP | 0 GBP | Client A receives 1.72317 USD |
| | N (T = 2.3) | 30 USD | 28.27683 USD | Client N receives 1.07224 GBP |

Client A requirement is executed in its entirety and Client A is removed from the queue.
Client N requirement is partially executed and Client N remains in the queue.

| Time | Client | Initial Position | $SCQ^R$ | Description |
|---|---|---|---|---|
| | | F | | |
| T = 2.3 | C (T = 1.2) | 3.58174 GBP | 0 GBP | Client C receives 8.37083 CAD |
| | M (T = 2.2) | 19.5 CAD | 11.12917 CAD | Client M receives 9.11481 AUD |
| | E (T = 1.4) | 30 AUD | 20.88519 AUD | Client E receives 5.75612 USD |
| | N (T = 2.3) | 28.27683 USD | 22.52071 USD | Client N receives 3.58174 GBP |

Client C requirement is executed in its entirety and Client C is removed from the queue.
Client M requirement is partially executed and Client M remains in the queue.
Client E requirement is partially executed and Client E remains in the queue.
Client N requirement is partially executed and Client N remains in the queue.

8. Sample Client Positions (after 14 observations)

| Client | SCQ | SC | BC | Net BCQ (A) | $SCQ^{R\ USD}$ | % B/A |
|---|---|---|---|---|---|---|
| A | 20 | GBP | USD | 32.14 | 0.00 | 0.00% |
| B | 15 | CAD | JPY | 1128.93 | 0.00 | 0.00% |
| C | 10 | GBP | CAD | 23.37 | 0.00 | 0.00% |
| D | 800 | JPY | USD | 0.00 | 7.31 | 100.00% |

-continued

| Client | SCQ | SC | BC | Net BCQ (A) | $SCQ^{R\ USD}$ | % B/A |
|---|---|---|---|---|---|---|
| E | 30 | AUD | USD | 5.76 | 13.19 | 69.62% |
| F | 35 | USD | EUR | 30.00 | 4.52 | 13.09% |
| G | 15 | CAD | ZAR | 65.26 | 0.00 | 0.00% |
| H | 3000 | JPY | CAD | 39.86 | 0.00 | 0.00% |
| I | 30 | EUR | GBP | 18.93 | 0.00 | 0.00% |
| J | 40 | CAD | JPY | 1871.07 | 1139.42 | 37.85% |
| K | 25 | EUR | CHF | 0.00 | 41.25 | 100.00% |
| L | 110 | ZAR | GBP | 6.42 | 4.40 | 40.68% |
| M | 19.5 | CAD | AUD | 9.11 | 12.12 | 57.07% |
| N | 30 | USD | GBP | 4.65 | 14.01 | 75.07% |

Note:
% B/A is the percentage of currency which is, as yet, unfilled after 14 observations.

9. Summary of Results

| Client | Initial Req't (in USD) | Value Executed (in USD) | % Executed |
|---|---|---|---|
| A | 32.14 | 32.14 | 100% |
| B | 10.31 | 10.31 | 100% |
| C | 16.07 | 16.07 | 100% |
| D | 7.31 | 0.00 | 0% |
| E | 18.95 | 5.76 | 30% |
| F | 35.00 | 30.42 | 87% |
| G | 10.31 | 10.31 | 100% |
| H | 27.41 | 27.41 | 100% |
| I | 30.42 | 30.42 | 100% |
| J | 27.51 | 17.10 | 62% |
| K | 25.35 | 0.00 | 0% |
| L | 17.39 | 10.31 | 59% |
| M | 13.41 | 5.76 | 43% |
| N | 30.00 | 7.48 | 25% |
| Totals | 301.57 | 203.49 | 67% |

10. Observation from Table 8.0

| | | |
|---|---|---|
| A | Percentage of Transactions executed fully | 43% |
| B | Percentage of Transactions executed partially | 43% |
| C | Percentage of Remaining Transactions | 14% |
| D | Initial USD equivalent value in queue | 301.57 |
| E | Value of USD equivalent Matched | 203.49 |
| F | Percentage of Value Matched | 67% |

11. Glossary of Terms

SC Source Currency—the available currency i.e. the currency to be converted

BC Beneficiary Currency—the desired or destination currency i.e. the currency into which the source funds will be converted AV Assignment Value—an identifier used to distinguish one currency from another eg. GBPAV=1.E+02; AVs are used to source matches between clients (see Searching Algorithm). Currency pairs or multiples have unique AV totals (see Table 7.2); for example, a pairing of CAD & GBP is identified by 110; GBP & USD by 101; CAD & JPY by 1010 etc.

SCAV Source Currency Assignment Value—the value assigned to the source currency of a client transaction e.g. if client has GBP for conversion to CAD, SC=GBP, therefore SCAV =GBPAV=1.E+02 (see Table 7.2)

BCAV Beneficiary Currency Assignment Value—the value assigned to the beneficiary currency of a client transaction e.g. if client has GBP for conversion to CAD, BC=CAD, therefore BCAV=CADAV=1.E+01 (see Table 7.2)

AV Match Assignment Value Match—by definition, a match occurs when the Source Currency AV of two or more parties is equal to the Beneficiary Currency AV of those same parties; SCAV=BCAV or SCAV−BCAV=0 eg. If one cliet has GBP to convert to CAD and another client has CAD to convert to GBP,

SCAV=GBPAV+CADAV=110=BCAV=GBPAV+CADAV

SCQ Source Currency Quantity—the amount of source currency to be converted

BCQ Beneficiary Currency Quantity—the amount of beneficiary currency available post-transaction(s)

$Q^{USD}$ Represents a Source Currency in USD equivalent terms, used to compare the SCQs of the participants in a transaction to discover the SCQq (see below)

R Foreign Exchange Rate—the amount of one currency required to procure another eg. If 109.45 JPY=1 USD; R=USD/JPY=109.45

SCQq Represents the limiting factor to a transaction, the SCQq is the smallest SCQ (or $SCQ^R$), as denoted in USD terms, from the participants to a transaction.

$SCQ^T$ Represents the quantity of currency contributed by a client in executing a transaction.

$$SCQ^T=SCQq\times R^{USD/SC}$$

$SCQ^R$ Represents the residual currency post-transaction available in the queue for future matches.

$$SCQ^R=SCQ-SCQ^T$$

Queue All of the SCQ'S available for transactions, prioritized by system transaction rules and user-defined parameters.

The invention claimed is:

1. A computer based system which enables a party and counterparty to be efficiently matched, comprising:

a first computer terminal into which the party inputs details of a potential first financial transaction to buy an amount of a first currency using a second currency, a second computer terminal into which the counterparty inputs details of a potential second financial transaction to sell an amount of that first currency and to receive the second currency or another currency, a computer network connecting the first and second terminals;

characterized in there being:

(a) a computer program that allocates to each currency a unique identifier such that each possible combination of currencies to be bought and sold by parties and counterparties is uniquely identifiable by a total combination identifier that is a single binary number derived from a unique binary identifier assigned to each currency and wherein a total of combinations T(n, x) is the number of total combination identifiers and is calculated by the formula:

$$T(n,x)=C(n,x)+C(n,x-1)+C(n,x-2)+\ldots+C(n,2)$$

where n is a positive integer that represents the number of currencies corresponding to a current currency trade, x is a positive integer such that $x\geqq 2$ and $x\leqq n$, and wherein C(n, x) represents one of the total combinations given n and x, the system supports up to 20 currencies environment with a maximum of 6 participants to a transaction; and (b) a computer program arranged to determine, prior to the first and second transactions occurring, a net payment position if either the first and second transactions were to occur only in part and to complete each transaction on the basis of the net payment position.

2. The computer based system as claimed in claim 1 wherein there are several party/counterparty pairs in a connected series of financial transactions such that only by combining all of the connected transactions are all of the parties and counterparties satisfied in whole or part.

3. A computer based system as claimed in claim 1 wherein the Internet comprises some of the network connecting the first and second terminals.

4. The computer based system as claimed in claim 1 wherein the program is designed to identify and complete transactions in first in—first out (FIFO) order limited only by a set of user defined parameters and transaction system rules.

5. The computer based system of claim 1 in which each unique identifier is an assignment value number in the form $10^N$, with N being different for each currency.

6. The computer based system of claim 5 in which the assignment value combination identifier for a given combination of currencies is calculated by adding the unique identifiers for each currency in that combination.

7. The computer based system of claim 1 in which a match between a combination of currencies to be bought and a combination of currencies to be sold is identified by a program able to calculate combination identifiers for all possible combinations to be bought and to be sold and to identify a match where a combination identifier for a combination to be sold equals a combination identifier for a combination to be bought.

8. The computer based system of claim 7 in which the amount of currency available for matching in any given combination is determined by a calculation which involves converting the currencies in that combination to a base currency.

9. A method of completing a foreign exchange transaction for a party, comprising the steps of:

(a) defining a foreign exchange requirement relating to the party offering buying an amount of a first currency using a second currency the using a web browser;

(b) sending the requirement via the Internet to a server; and (c) processing that requirement by identifying one or more matching counterparties offering to sell an amount of that first currency and to receive the second currency or another currency using (i) a computer program that allocates to each of the different kinds of currencies a unique identifier such that each possible combination of kinds of foreign exchange to be bought and sold is uniquely identifiable by a total combination identifier that is a single binary number derived from the unique binary identifier assigned to each currency and wherein a total of combinations T(n, x) is the number of total combination identifiers and is calculated by the formula:

$$T(n, x)=C(n, x)+C(n, x-1)+C(n, x-2)+ \ldots +C(n,2)$$

where n is a positive integer that represents the number of currencies corresponding to a current currency trade, x is a positive integer such that x≧2 and x≦n, and wherein C(n, x) represents one of the total combinations given n and x; the method supports up to 20 currencies environment with a maximum of 6 participants to a transaction and (ii) a computer program arranged to determine prior to the transaction occurring a net payment position between the party and the or each counterparty if either the first and second transactions were to occur only in part and to subsequently complete the transaction between the party and the or each counterparty on the basis of the net payment position.

10. A computer terminal configured as a server and programmed to process a foreign exchange transaction between a party and a counterparty, the transaction relating to different kinds of currencies, in which the server is programmed to (a) allocate to each of the different kinds of currency a unique identifier such that each possible combination of currencies to be bought and sold by parties and counterparties is uniquely identifiable by a total combination identifier that is a single binary number derived from the unique binary identifier assigned to each currency and wherein a total of combinations T(n, x) is the number of total combination identifiers and is calculated by the formula:

$$T(n, x)=C(n, x)+C(n, x-1)+C(n, x-2)+ \ldots +C(n,2)$$

where n is a positive integer that represents the number of currencies corresponding to a current currency trade, x is a positive integer such that x≧2 and x≦n, and wherein C(n, x) represents the number of combinations given n and x; the server supports up to 20 currencies environment with a maximum of 6 participants to a transaction and (b) to determine, prior to the transaction occurring, a net payment position between the party and a counterparty if the transaction were to occur only in part and to complete the transaction between the party and the counterparty on the basis of the net payment position.

11. A computer terminal acting as a client, in which the client accepts from a party a foreign exchange requirement and sends that requirement to a server as defined in claim 10.

12. A method of obtaining foreign exchange comprising the following steps:

(a) defining, by a party offering to buy an amount of a first currency using a second currency, a foreign exchange requirement using a web browser;

(b) defining, by a counterparty offering to sell an amount of that first currency and to receive the second currency or another currency, a foreign exchange requirement using a web browser, (c) sending, by the party, the requirement via the Internet to a remote computer which processes or enables the processing of that requirement using a computer program arranged to (i) allocate to each of the different kinds of currencies a unique identifier such that each possible combination of kinds of currency to be bought and sold is uniquely identifiable by a total combination identifier that is a single binary number derived from a unique binary identifier assigned to each currency and wherein a total of combinations T(n, x) is the number of total combination identifiers and is calculated by the formula:

$$T(n, x)=C(n, x)+C(n, x-1)+C(n, x-2)+ \ldots +C(n,2)$$

where n is a positive integer that represents the number of currencies corresponding to a current currency trade, x is a positive integer such that x≧2 and x≦n, and wherein C(n, x) represents one of the total combinations given n and x: the method supports up to 20 currencies environment with a maximum of 6 participants to a transaction and (ii) to determine, prior to the foreign exchange occurring a net payment position if either the first and second transactions were to occur only in part and subsequently to complete the foreign exchange transaction between the party and the counterparty on the basis of the net payment position; and (d) the party receives foreign exchange in satisfaction of its requirement.

* * * * *